US008840831B2

(12) United States Patent
Davies et al.

(10) Patent No.: US 8,840,831 B2
(45) Date of Patent: Sep. 23, 2014

(54) POLYCRYSTALLINE DIAMOND COMPOSITES

(76) Inventors: Geoffrey John Davies, Springs (ZA); Gerrard Peters, Springs (ZA)

( * ) Notice: Subject to any disclaimer, the term of this patent is extended or adjusted under 35 U.S.C. 154(b) by 384 days.

(21) Appl. No.: 12/526,228

(22) PCT Filed: May 6, 2008

(86) PCT No.: PCT/IB2008/051749
§ 371 (c)(1),
(2), (4) Date: May 14, 2010

(87) PCT Pub. No.: WO2008/135949
PCT Pub. Date: Nov. 13, 2008

(65) Prior Publication Data
US 2010/0330357 A1    Dec. 30, 2010

(30) Foreign Application Priority Data
May 7, 2007 (ZA) .................................. 2007/03669

(51) Int. Cl.
*B01J 3/06* (2006.01)
*C22C 26/00* (2006.01)

(52) U.S. Cl.
CPC ................ *B01J 3/062* (2013.01); *C22C 26/00* (2013.01); *B01J 2203/062* (2013.01); *B01J 2203/0685* (2013.01); *B01J 2203/0655* (2013.01)
USPC .......................................... 264/642; 175/434

(58) Field of Classification Search
USPC ................................................ 264/642, 625
See application file for complete search history.

(56) References Cited

U.S. PATENT DOCUMENTS

| | | | | |
|---|---|---|---|---|
| 4,311,490 A | * | 1/1982 | Bovenkerk et al. | ............. 51/307 |
| 4,505,746 A | * | 3/1985 | Nakai et al. | ..................... 75/243 |
| 4,636,253 A | * | 1/1987 | Nakai et al. | ..................... 75/239 |
| 5,441,817 A | | 8/1995 | Rai | |
| 6,068,913 A | * | 5/2000 | Cho et al. | ........................ 428/212 |
| 6,132,675 A | | 10/2000 | Corrigan et al. | |
| 6,261,329 B1 | | 7/2001 | Ogata et al. | |
| 6,544,308 B2 | * | 4/2003 | Griffin et al. | ................... 51/309 |
| 2006/0157285 A1 | * | 7/2006 | Cannon et al. | ................. 175/374 |
| 2006/0191723 A1 | * | 8/2006 | Keshavan | ..................... 175/374 |
| 2007/0144790 A1 | * | 6/2007 | Fang et al. | ..................... 175/434 |

FOREIGN PATENT DOCUMENTS

| | | |
|---|---|---|
| EP | 0 174 546 A | 3/1986 |
| EP | 0 223 585 A | 5/1987 |
| GB | 806406 A * | 12/1958 |
| GB | 1450271 | 9/1976 |

(Continued)

OTHER PUBLICATIONS

Yu, Hongchang et al.: "Sintering of ultrafine diamond particles under high temperature and high pressure", 6178, *Diamond and Related Materials* Feb. 3, (1994), No. 3, pp. 222-226.

*Primary Examiner* — Matthew Daniels
*Assistant Examiner* — Lisa Herring
(74) *Attorney, Agent, or Firm* — Frommer Lawrence & Haug LLP; Ronald R Santucci

(57) ABSTRACT

A method of producing a PCD body includes the step of providing a region of coarser diamond particles between a source of binder phase and a region of fine grained diamond particles having a particle size less than 2 μm. The binder phase is caused to infiltrate the diamond mass through the region of coarser diamond particles under elevated temperature and pressure conditions suitable to produce PCD. The invention further provides for a PCD diamond composite manufactured by the method of the invention wherein the PCD body is substantially free of abnormal diamond growth.

10 Claims, 2 Drawing Sheets

(56) References Cited

FOREIGN PATENT DOCUMENTS

| JP | 57-175775 A | 10/1982 |
|---|---|---|
| JP | 09-316587 A | 12/1997 |
| JP | 2004-512181 A | 4/2004 |
| JP | 2005-516139 A | 6/2005 |
| JP | 2007-501133 A | 1/2007 |
| WO | WO 02/34437 A | 5/2002 |
| WO | WO 03/064806 A | 8/2003 |
| WO | WO 2004/106004 A | 12/2004 |

* cited by examiner

POLYCRYSTALLINE DIAMOND COMPOSITES

This application is a 371 of PCT/IB2008/051749 filed on May 6, 2008, published on Nov. 13, 2008 under publication number WO 2008/135949 A and claims priority benefits of South African Patent Application No. 2007/03669 filed May 7, 2007, the disclosure of which is incorporated herein by reference.

BACKGROUND OF THE INVENTION

This invention relates to a method of producing polycrystalline diamond composites, and to polycrystalline diamond composites so produced.

Polycrystalline diamond (PCD) composites generally consist of a layer of polycrystalline diamond bonded onto a carbide substrate using a high pressure-high temperature (HpHT) process. The PCD layer is a dense layer of sintered diamond particles in a metallic binder phase, such as cobalt, iron, or nickel, or an alloy containing one or more such metals. The method for producing a PCD composite generally comprises encapsulating diamond powder and a carbide substrate in a refractory metal, such as tantalum, molybdenum and niobium, and subjecting the encapsulated assembly to typical HpHT conditions at which the polycrystalline diamond is crystallographically and thermodynamically stable. The source of the binder phase is generally provided by the carbide substrate, which infiltrates into the PCD layer during the HpHT process.

Polycrystalline diamond composites are preferred in a number of applications, such as oil and gas drilling, cutting tools for machining, and as wear parts. Fine grain PCD has displayed superior wear and abrasion resistance over coarser diamond grades due to the high strength and hardness of the finer diamond grain size PCD.

During the HpHT process, metal infiltrates the diamond layer involving the processes of melting, capillary action and diffusion; and acts as a solvent/catalyst for the recrystallisation and sintering of the diamond particles. During infiltration, the molten solvent metal from the carbide substrate reacts with the immediate diamond layer, dissolving the fine component of that layer completely.

Very fine grades of PCD, where the diamond particle size is typically less than 2 μm, are often prone to abnormal grain growth due to the much higher solubility of very fine diamond in the molten metal solvent/catalyst. Through a mechanism known as Ostwald ripening, carbon from the fine particles dissolves preferentially (compared to the coarser particles) in the solvent/catalyst; and then re-precipitates on any remaining coarse particles themselves. This size-dependent solubility effect results in the exaggerated growth of the coarse particles where abnormal diamond grains that are typically between 50 and 200 μm in size can be observed. Grains such as these constitute major flaws within the diamond microstructure and can significantly reduce the performance of the material.

Abnormal diamond grain growth is reported to be controlled by the use of sintering aids such as WC, Ni—Zr alloy and cubic boron nitride [1]. The use of W metal as a sintering aid to control grain growth is also described in U.S. Pat. No. 6,261,329.

U.S. Pat. No. 5,441,817 describes the use of a thin refractory shim or layer on the WC—Co substrate together with admixed refractory material within the diamond powder layer. A suitable refractory material is said to be titanium carbide and/or titanium carbonitride. These are said to regulate the flow of molten metal from the substrate into the diamond layer and hence minimize abnormal grain growth and bond metal depletion at the diamond/substrate interface.

One disadvantage of these prior art systems lies in the formation of complex intermetallics with the cobalt binder in the PCD layer, which rely on accurate control of HpHT conditions. Another disadvantage of the prior art systems is the interference of these additional species with the kinetic sintering processes. This is likely to influence diamond/diamond bonding and especially so for finer-grained (<2 μm) PCD.

U.S. Pat. No. 4,311,490 describes a polycrystalline diamond composite in which the PCD layer is produced from a layer of coarse diamond of particle size 75 to 500 μm adjacent the carbide substrate and a layer of fine diamond of particle size less than 10 μm on the layer of coarse diamond. The working example uses diamond of 6 μm particle size for the fine diamond. The use of coarse and fine diamond in a layered structure is said to reduce the incidence of soft spot formation in the PCD. The problem of abnormal grain growth is not addressed, which is not surprising since such abnormal grain growth would not be evident in the PCD of this US patent because of the relatively large diamond particles used in the "finer" layer.

SUMMARY OF THE INVENTION

According to a first aspect of the invention, a method of producing a PCD body includes the steps of providing a mass of diamond particles and a source of binder phase, the mass of diamond particles having a region of fine diamond particles of average particle (grain) size generally less than 2 μm and a region of coarser diamond particles of average particle (grain) size greater than that of the region of fine diamond particles, and causing the binder phase to infiltrate the diamond mass through the region of coarser diamond particles under elevated temperature and pressure conditions suitable to produce PCD.

The source of binder phase will generally be a cemented carbide substrate. The diamond mass will be placed in contact with a surface of the substrate prior to the application of the elevated temperature and pressure conditions.

The binder phase will preferably be a diamond catalyst/solvent such as cobalt, iron or nickel.

The regions of fine and coarser diamond will preferably take the form of layers.

The average particle (grain) size of the coarser diamond region is preferably greater than 2 μm, more preferably greater than 3 μm, and most preferably greater than 4 μm, and preferably less than 30 μm, more preferably less than 15 μm, and most preferably less than 10 μm. The average diamond grain size is applicable whether the diamond has a uni-modal, bi-modal or multi-modal distribution.

When the coarser diamond particles are in the form of a layer, the thickness of the layer is preferably greater than 5 μm, and more preferably greater than 10 μm, and is preferably less than 1500 μm, more preferably less than 1200 μm, and most preferably less than 1000 μm.

The region of fine diamond will preferably constitute at least 50 percent by volume of the entire diamond mass. The invention has particular application to the manufacture of PCD bodies that have a thickness of 1 mm or greater.

The HpHT conditions necessary to produce PCD from a mass of diamond particles are well known in the art. Typically, these conditions are pressures in the range 4 to 6 GPa and temperatures in the range 1300 to 1700° C.

The invention produces a PCD body from fine grain diamond particles. It has been found that infiltrating the binder phase through a layer of coarser diamond particles substantially reduces the incidence of abnormal diamond growth.

Thus, the invention provides according to another aspect a polycrystalline diamond composite comprising a PCD body, preferably bonded to a cemented carbide substrate, which is fine grained, at least 50 volume percent of the PCD body having been produced from diamond particles having an average particle size of generally less than 2 µm, and is substantially free of abnormal diamond growth. The PCD body will typically be in the form of a layer, preferably having a thickness of 1 mm or greater.

DETAILED DESCRIPTION OF THE INVENTION

Figure 1:
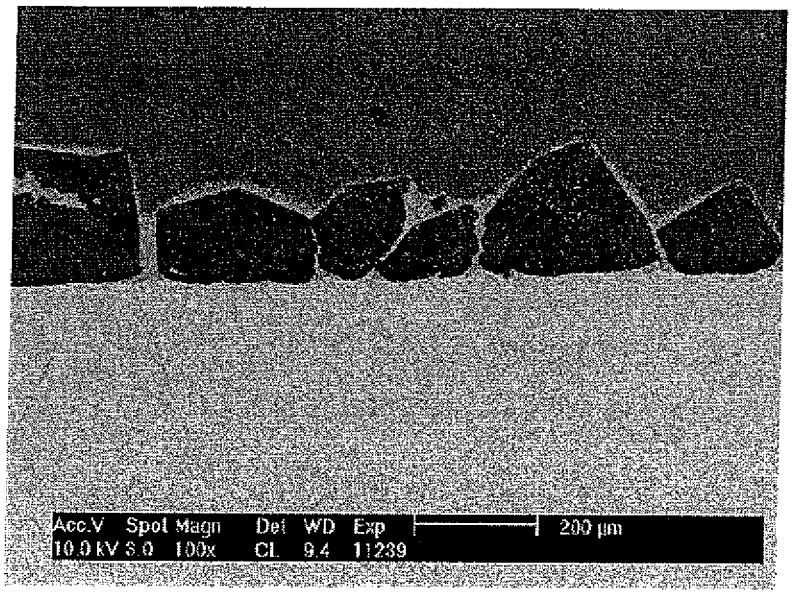
FIG. 1 is a micrograph of a sectioned and polished prior art PCD composite.

Methods for producing a PCD composite are known in the art and involve, as a first step, encapsulating diamond powder and a carbide substrate in a refractory metal such as Ta, Mo, Nb. The source of the binder phase is generally provided by the carbide substrate, which infiltrates into the PCD layer during the HpHT process. During infiltration, the molten solvent metal from the carbide substrate reacts with the diamond layer, dissolving the fines completely. Fine grades of PCD, with average diamond grain sizes that are generally <2 µm, are often prone to abnormal grain growth due to the much higher solubility of very fine diamond in the metal solvent/catalyst. These abnormal diamond grains are typically between 50 and 200 µm in size, depending on the HpHT conditions, and the mechanism for grain growth is usually explained in terms of Ostwald ripening. An example of this type of abnormal diamond growth at the PCD/substrate interface is shown in FIG. 1. These large, abnormal diamond grains act as flaws in that region, weakening the structure of the PCD compact.

It has been found that the introduction of a layer of coarser diamond particles between the fine grain diamond layer and the carbide substrate effectively eliminates abnormal diamond grain growth at the carbide-diamond interface. Without wishing to be bound by theory, it is believed that this may occur by restricting or removing the conditions required for Ostwald ripening. The coarser diamond interlayer appears to act as a "conditioning" layer by saturating the molten metal infiltrant with carbon from a controlled (i.e. larger-grained) source which is not "super-soluble". As this occurs prior to infiltrating the fine diamond layer, these fine grains are rendered far more stable in the molten metal front. Additionally, the larger pores associated with the coarser diamond layer seem to create channels for easier infiltration of the molten metal into the fine grain diamond layer, thereby also reducing the incidence of poorly infiltrated regions near the top layer of the PCD compact.

The invention provides a method of reducing abnormal grain growth in fine grade PCD and the fine grade PCD so produced. Fine diamond particles which are used in manufacturing fine grade PCD will have a particle size generally less than 2 µm. It will be appreciated by those skilled in the art that there will be some overlap where particle size blending may result in a size distribution character that lies slightly outside an anticipated limit. For example, it is likely that a bimodal blend of 70% 3 µm diamond and 30% 0.5 µm diamond (with an overall average of 2.25 µm) will show some abnormal grain growth if used alone in a PCD table because of the larger number of fine diamond particles. This would not typically be the case if the blend were unimodal or multimodal, as these tend to have a more statistically normal character; and hence would have fewer very fine particles for the same average. The method of the invention will typically be effective in controlling abnormal grain growth in any PCD table where this phenomenon arises because of the increased solubility of a significant amount of fine diamond present in the mixture. It may equally be desirable to "bulk up" slightly a diamond mixture that is intended for the coarser diamond layer, by reducing the effective number of very fine particles in order to increase or improve the effectiveness of the grain growth controlling properties of the coarser diamond layer.

The layer of coarser diamond particles may be introduced using several methods known in the art for manufacturing layered or zoned PCD materials. In the simplest form, it may be introduced as a separate powder layer. If it is incorporated into a slurry or mixture with organic binders and the like, it may be cast as a tape or paper and then stacked to achieve the desired thickness. As a slurry it may also be introduced onto the cemented carbide substrate by painting, dipping, spray-coating and other similar methods known in the art.

The invention will now be described by way of the following non-limiting examples.

EXAMPLE 1

A number of PCD composites, each comprising a PCD layer bonded to a cemented carbide substrate, were produced using a layer of fine diamond (less than 2 µm in size) and interlayers of varying grain size of a coarser diamond between the layer of fine diamond and the cemented tungsten carbide substrate. The overall thickness of PCD layer produced was greater than 1 mm. For each PCD composite a layer of about 2 mm of fine diamond (particle size less than 2 µm) was placed on a layer of coarser diamond having a thickness of 100 to 500 µm. The unbonded samples were each sintered under HpHT conditions at a temperature of about 1400° C., and a pressure of about 5.5 GPa. The PCD composite samples thus produced (samples 2 to 8) were sectioned, polished, and examined for abnormal grain growth at the substrate interface, in comparison to a PCD composite (sample 1) having no such interlayer of coarser diamond particles. The results are set out in Table 1.

TABLE 1

| Sample number | Average diamond grain size of interlayer | Diamond size distribution | Observations |
| --- | --- | --- | --- |
| 1 | No interlayer | Single mode | Severe grain growth |
| 2 | 2 | Single mode | Slight grain growth |
| 3 | 3.5 | Single mode | No grain growth |
| 4 | 5.5 | multi mode | No grain growth |
| 5 | 6 | Single mode | No grain growth |
| 6 | 9 | multi mode | No grain growth |
| 7 | 10 | Single mode | No grain growth |
| 8 | 12 | multi mode | No grain growth |

It is evident that abnormal grain growth is not observed where the coarser diamond interlayer is greater than 2 µm in average grain size; compared to the comparative example which had no coarser diamond interlayer.

Figure 2:
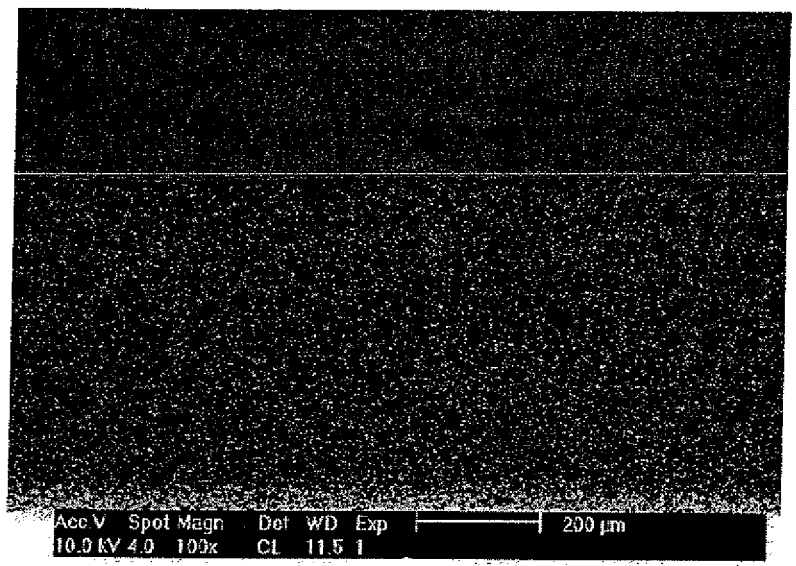
FIG. 2 is a micrograph of a sectioned and polished PCD composite of a preferred embodiment of the invention.

An example of abnormal diamond grain growth is typical of that shown in FIG. 1. An example of a composite with coarser diamond interlayer and with no abnormal diamond grain growth present is shown in FIG. 2.

Figure 3:
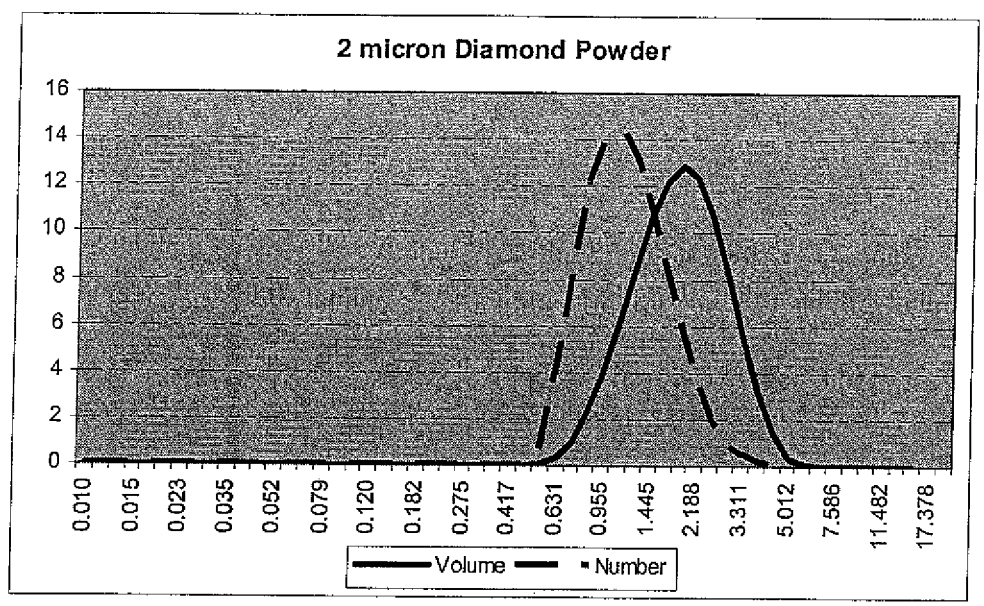
FIG. 3 is a Malvern size distribution curve for a fine diamond powder.

Sample 2 (with an average mode of 2 μm) did show some evidence of abnormal diamond growth; which is likely to be due to the significant number of submicron particles present in the size distribution. FIG. 3 shows a Malvern size distribution curve for the 2 μm diamond powder, where almost 50% of the number of particles in the size distribution are less than 1 μm. These fines would easily be dissolved by the infiltrating molten metal, setting up the conditions for Ostwalt ripening to occur at the substrate interface resulting in abnormal grain growth. Reducing the fine tail or number of fines from the distribution would result in controlling the abnormal diamond grain growth even further.

EXAMPLE 2

In this example a coarser diamond particle interlayer (which was a multimodal with an average grain size of 6 μm) was produced by spray-coating the cemented carbide substrate with a diamond slurry formed with an organic binder (an aqueous methyl cellulose solution). The slurry was spray-coated onto the substrate with a normal spray-painting nozzle using a carrier of compressed air. The resultant layer was allowed to dry and was found to have a thickness of about 200 μm in the green state. This coated substrate was then placed in a bed of fine diamond powder (a monomodal distribution with an average grain size of 0.25 μm) in the usual manner and sintered under HpHT conditions. In the final sintered diamond compact, the resultant coarser diamond layer was about 50 μm in thickness (where the fast remnant coarser particles were 50 μm above the diamond-carbide interface). There was no evidence of abnormal grain growth in the sample, which compared very favourably to those previously manufactured using only the fine diamond layer, which showed significant abnormal grain growth.

REFERENCES

[1] T. Shin, J. Oh, K. H. Oh, D. N. Lee; *Diamond and Related Materials;* 13; (2004), pp 488-494.

The invention claimed is:
1. A method of producing a polycrystalline diamond (PCD) body bonded to a cemented carbide substrate, the substrate providing a source of binder phase, the polycrystalline diamond body comprising a first layer of polycrystalline diamond produced from coarse diamond particles having a particle size of greater than 3 microns and less than 30 microns adjacent the cemented carbide substrate and a second layer of polycrystalline diamond adjacent the first layer produced from fine diamond having a particle size of less than 2 microns, the second layer constituting at least 50 volume percent of the polycrystalline diamond body and wherein the polycrystalline diamond body is substantially free of abnormal diamond growth, including the steps of:
   providing the layer of coarse diamond particles having a particle size greater than 3 microns and less than 30 microns on the cemented carbide substrate,
   providing the layer of fine diamond particles having a particle size of less than 2 microns on the layer of coarse diamond particles; and
   causing the binder from the cemented carbide substrate to infiltrate through the layer of coarse diamond particles and into the layer of fine diamond particles under elevated temperature and pressure conditions suitable to produce polycrystalline diamond, thereby producing the polycrystalline diamond body substantially free of abnormal diamond growth.

2. A method according to claim 1, wherein the binder phase is a diamond catalyst/solvent including cobalt, iron or nickel.

3. A method according to claim 1, wherein the average particle size of the coarse diamond particle layer is greater than 4 μm.

4. A method according to claim 1, wherein the average particle size of the coarse diamond particle layer is less than 15 μm.

5. A method according to claim 1, wherein the average particle size of the coarse diamond particle layer is less than 10 μm.

6. A method according to claim 1, wherein the thickness of the coarse diamond particle layer is greater than 5 μm.

7. A method according to claim 6, wherein the thickness of the coarse diamond particle layer is greater than 10 μm.

8. A method according to claim 1, wherein the thickness of the coarse diamond particle layer is less than 1500 μm.

9. A method according to claim 8, wherein the thickness of the coarse diamond particle layer is less than 1200 μm.

10. A method according to claim 9, wherein the thickness of the coarse diamond particle layer is less than 1000 μm.

* * * * *